(12) United States Patent
Kang et al.

(10) Patent No.: US 12,712,233 B2
(45) Date of Patent: Aug. 18, 2026

(54) BATTERY PACK HAVING FIXING DEVICE USING MAGNETIC FORCE, MANUFACTURING METHOD THEREOF, METHOD FOR REPLACING BATTERY CELL OF BATTERY PACK

(71) Applicant: LG ENERGY SOLUTION, LTD., Seoul (KR)

(72) Inventors: Ga Hee Kang, Daejeon (KR); Hyoung Kwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 594 days.

(21) Appl. No.: 18/036,599

(22) PCT Filed: Dec. 21, 2021

(86) PCT No.: PCT/KR2021/019548
§ 371 (c)(1),
(2) Date: May 11, 2023

(87) PCT Pub. No.: WO2022/139430
PCT Pub. Date: Jun. 30, 2022

(65) Prior Publication Data

US 2024/0014500 A1 Jan. 11, 2024

(30) Foreign Application Priority Data

Dec. 24, 2020 (KR) ........................ 10-2020-0183785

(51) Int. Cl.
*H01M 50/264* (2021.01)
*H01M 10/04* (2006.01)
(Continued)

(52) U.S. Cl.
CPC ..... *H01M 50/264* (2021.01); *H01M 10/0422* (2013.01); *H01M 10/42* (2013.01); *H01M 50/271* (2021.01); *H01M 50/507* (2021.01)

(58) Field of Classification Search
CPC ............. H01M 10/0422; H01M 10/42; H01M 10/4207; H01M 50/213; H01M 50/244;
(Continued)

(56) References Cited

U.S. PATENT DOCUMENTS 6,395,980 B2 5/2002 Iitsuka
9,017,855 B2 4/2015 Park et al.
(Continued)

FOREIGN PATENT DOCUMENTS

CN 205016596 U 2/2016
CN 205970890 U 2/2017
(Continued)

OTHER PUBLICATIONS

Office Action dated Jul. 29, 2025 issued in the corresponding Chinese Patent Application No. 202180056896.3.
(Continued)

*Primary Examiner* — Daniel S Gatewood
(74) *Attorney, Agent, or Firm* — Morgan, Lewis & Bockius LLP

(57) ABSTRACT

A battery pack, a manufacturing method thereof, and a method for replacing a battery cell of the battery pack are provided. The battery pack includes a battery pack housing, a plurality of battery cells in the battery pack housing, and a fixing unit in the battery pack housing and configured to fix a position of the plurality of battery cells by a magnetic force.

19 Claims, 5 Drawing Sheets

(51) Int. Cl.

*H01M 10/42* (2006.01)
*H01M 50/271* (2021.01)
*H01M 50/507* (2021.01)

(58) Field of Classification Search

CPC ............. H01M 50/264; H01M 50/271; H01M 50/282; H01M 50/289; H01M 50/291; H01M 50/293; H01M 50/502; H01M 50/505; H01M 50/507; H01M 2220/20; Y02E 60/10

See application file for complete search history.

(56) References Cited

U.S. PATENT DOCUMENTS

| | | | | |
|---|---|---|---|---|
| 9,525,195 | B2 | 12/2016 | Wyatt et al. | |
| 2010/0255355 | A1 | 10/2010 | Park et al. | |
| 2011/0287287 | A1 | 11/2011 | Kang | |
| 2018/0130981 | A1 | 5/2018 | Liu et al. | |
| 2018/0366765 | A1 | 12/2018 | Lee et al. | |
| 2019/0372071 | A1 | 12/2019 | An | |
| 2020/0083513 | A1* | 3/2020 | Lejosne | H01M 10/613 |
| 2022/0147859 | A1 | 5/2022 | Zhang et al. | |

FOREIGN PATENT DOCUMENTS

| | | | | |
|---|---|---|---|---|
| CN | 207637887 | U | | 7/2018 |
| CN | 210245594 | U | | 4/2020 |
| EP | 4009248 | A1 | | 6/2022 |
| JP | 2001210289 | A | | 8/2001 |
| JP | 3188425 | U | | 1/2014 |
| JP | 2017-54681 | A | | 3/2017 |
| JP | 2017098115 | A | * | 6/2017 |
| JP | 2017-183021 | A | | 10/2017 |
| JP | 6356874 | B2 | | 7/2018 |
| JP | 2020047543 | A | | 3/2020 |
| JP | 3234789 | U | | 11/2021 |
| JP | 2023501857 | A | | 1/2023 |
| KR | 10-0760751 | B1 | | 9/2007 |
| KR | 10-2008-0027505 | A | | 3/2008 |
| KR | 10-2009-0011601 | A | | 2/2009 |
| KR | 10-0934466 | B1 | | 12/2009 |
| KR | 10-2010-0088030 | A | | 8/2010 |
| KR | 10-2015-0132902 | A | | 11/2015 |
| KR | 10-2018-0129115 | A | | 12/2018 |
| KR | 10-2019-0023582 | A | | 3/2019 |
| KR | 10-2005401 | B1 | | 10/2019 |
| KR | 10-2020-0030489 | A | | 3/2020 |

OTHER PUBLICATIONS

Office Action dated Oct. 7, 2025 issued in the corresponding Japanese Patent Application No. No. 2025-020801.

Office Action issued Feb. 13, 2024 for Japanese Patent Application No. 2023-501857 (Note: JP 2017-098115 A & JP 2001-210289 A were cited in a prior IDS.).

First Office Action issued in corresponding Korean Patent Application No. 10-2020-0183785, dated Aug. 14, 2024.

Second Office Action issued in corresponding Japanese Patent Application No. 2023-501857, dated Aug. 5, 2024.

International Search Report and Written Opinion dated Apr. 5, 2022, issued in corresponding International Patent Application No. PCT/KR2021/019548.

* cited by examiner

BATTERY PACK HAVING FIXING DEVICE USING MAGNETIC FORCE, MANUFACTURING METHOD THEREOF, METHOD FOR REPLACING BATTERY CELL OF BATTERY PACK

TECHNICAL FIELD

The present disclosure relates to a battery pack including a fixing unit using a magnetic force and a manufacturing method thereof, and a method for placing a battery cell of the battery pack, and more particularly, to a battery pack including a fixing unit using a magnetic force, which is capable of easily fixing a plurality of battery cells in a battery pack housing, and a manufacturing method thereof, and a method for placing a battery cell of the battery pack.

BACKGROUND

A medium and large-sized device such as an electric vehicle requires a high output and large capacity power source. Thus, the medium and large-sized device generally uses a medium and large-sized battery pack in which a plurality of battery cells are electrically connected as a power source.

The plurality of battery cells may be connected by serial connection, parallel connection, or a mixed method of the serial connection and the parallel connection and maintain a stable structure against an external impact when connected, so that the medium and large-sized battery pack satisfies the high output and the large capacity required by the medium and large-sized device.

To this end, a typical medium and large-sized battery pack electrically connects and structurally fixes the plurality of battery cells by welding the plurality of battery cells to a busbar assembly. Here, this welding work is extremely complicated and sophisticated to require much time. Also, once components are welded, the components are hardly separated from each other. That is, when a portion of the battery cells are damaged, it is hard to separate and replace only the damaged battery cells. Also, the welding work may cause deformation of the battery cell according to a welding intensity and easily give an adverse effect on performance and safety of the battery cell.

The background technology of the present invention is disclosed in patent documents below.

(Patent document 1) KR10-2008-0027505 A (Patent document 2) KR10-2009-0011601 A (Patent document 3) KR10-2018-0129115 A

SUMMARY

The present disclosure provides a battery pack capable of easily fixing a plurality of battery cells in a battery pack housing by using a magnetic force.

The present disclosure also provides a method for manufacturing a battery pack, which is capable of easily fixing a plurality of battery cells in a battery pack housing by using a magnetic force.

The present disclosure also provides a method for replacing a battery cell of a battery pack, which is capable of easily replacing a wanted battery cell by using a magnetic force.

In accordance with an exemplary embodiment, a battery pack includes: a battery pack housing; a plurality of battery cells disposed in the battery pack housing; and a fixing unit disposed in the battery pack housing to fix a position of the plurality of battery cells by using a magnetic force.

The fixing unit may include: a plurality of first members respectively attached and coupled to top surfaces of the plurality of battery cells by a magnetic force; and a second member having a size corresponding to that of a bottom surface of a battery pack housing upper cover and attached and coupled to the plurality of first members by the magnetic force.

The fixing unit may include: a plurality of first members respectively attached and coupled to bottom surfaces of the plurality of battery cells by a magnetic force; and a second member having a size corresponding to that of a bottom surface of a battery pack housing lower case and attached and coupled to the plurality of first members by the magnetic force.

The fixing unit may include: a plurality of first members attached and coupled to a top surface and a bottom surface of each of the plurality of battery cells by a magnetic force; and a plurality of second members respectively disposed above and below the plurality of battery cells and attached and coupled to the plurality of first members by the magnetic force, and the plurality of second members may include the second member disposed above the plurality of battery cells, which has a size corresponding to that of a bottom surface of a battery pack housing upper cover, and the second member disposed below the plurality of battery cells, which has a size corresponding to that of a bottom surface of a battery pack housing lower case.

The first member may have a size corresponding to a top surface or a bottom surface of the battery cell and be coupled with the battery cell in a one-to-one correspondence manner, or the first member may have a size greater than that of the top surface or the bottom surface of the battery cell and be coupled with the plurality of battery cells.

The first member may be a magnet, and the second member may be a magnetic body.

Each of the first member and the second member may be a magnet, and the first member and the second member may have polarities so that an attractive force is applied between a top surface of the first member and a bottom surface of the second member.

At least a portion of the second member may be embedded and coupled to a bottom surface side of the battery pack housing upper cover.

At least a portion of the second member may be embedded and coupled to a bottom surface side of the battery pack housing lower case.

An anti-slippery film may be applied to at least a portion of a surface of the first member, and the anti-slippery film may have a predetermined thickness so that a magnetic force is transmitted therethrough.

An empty space may exist or at least one of a spacer and a filling material may be disposed between the plurality of battery cells.

A hole may be defined in each of the first member and the second member so that a busbar assembly passes therethrough to contact an electrode of the battery cell.

The battery pack may further include the busbar assembly disposed at an opposite side of the plurality of battery cells based on the second member, passing through the hole defined in the first member and the hole defined in the second member, and contacting and connected to the electrode of each of the plurality of battery cells.

The battery pack may further include a busbar assembly patterned on a surface of the first member and a surface of the second member and contacting and connected to an electrode of each of the plurality of battery cells.

In accordance with another exemplary embodiment, a method for manufacturing a battery pack including a fixing unit using a magnetic force includes: arranging a plurality of battery cells in a battery pack housing lower case; allowing the plurality of battery cells and the fixing unit to contact each other, and attaching and coupling the plurality of battery cells and the fixing unit by using a magnetic force of the fixing unit; and sealing the battery pack housing lower case by a battery pack housing upper cover.

In accordance with yet another exemplary embodiment, a method for replacing a battery cell of a battery pack, which replaces the battery cell of the battery pack including a plurality of battery cells, includes: separating a battery pack housing upper cover from a battery pack housing lower case; separating, from a plurality of battery cells, a fixing unit attached and coupled to the plurality of battery cells by a magnetic force thereof in the battery pack housing lower case; replacing a battery cell to be replaced among the plurality of battery cells with a new battery cell; attaching and coupling the fixing unit and the plurality of battery cells in which the battery cell to be replaced is replaced with the new battery cell by using the magnetic force of the fixing unit; and coupling the battery pack housing lower case with the battery pack housing upper cover to complete maintenance of the battery pack.

DETAILED DESCRIPTION OF EMBODIMENTS

Figure 1:
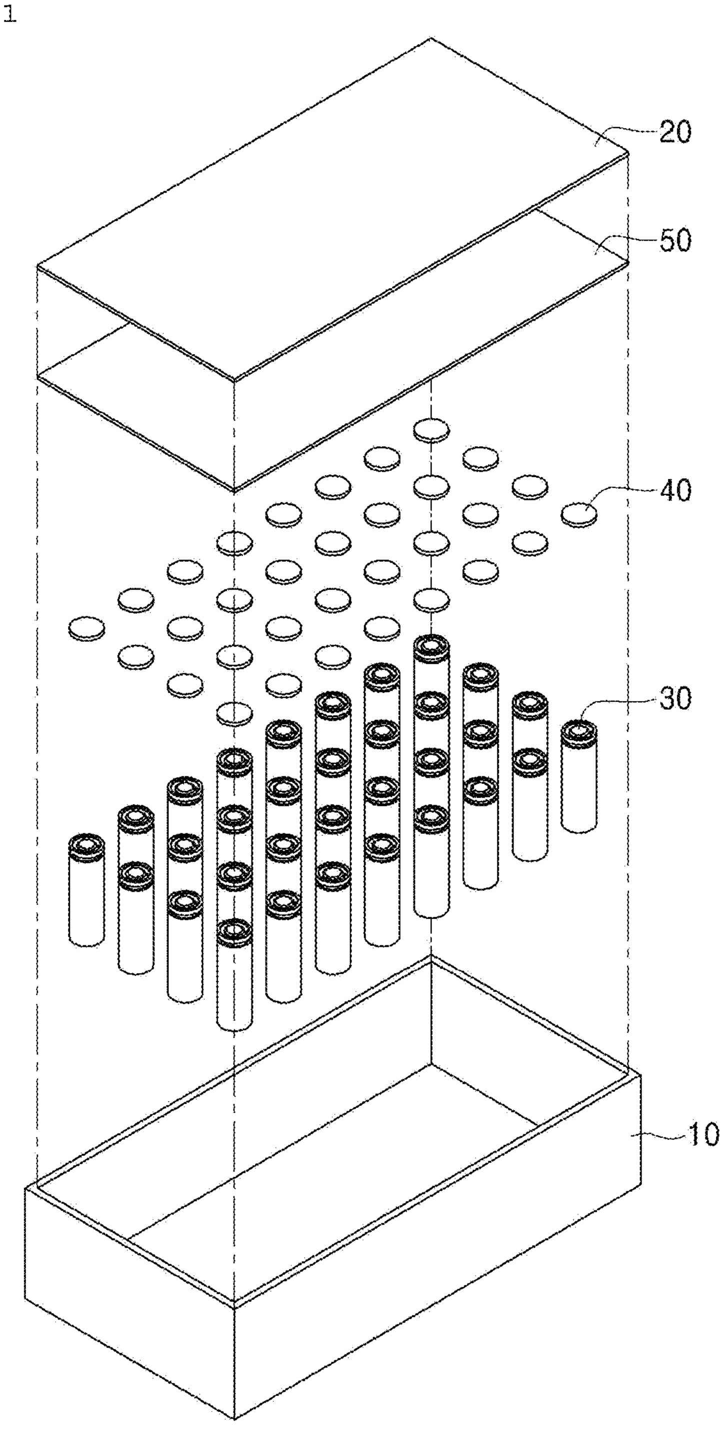
FIG. 1 is an exploded view illustrating a battery pack in accordance with an exemplary embodiment.

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Hereinafter, exemplary embodiments will be described in detail with reference to the accompanying drawings.

1. Battery Pack Including Fixing Unit Using Magnetic Force in Accordance with an Exemplary Embodiment (First Embodiment)

Figure 2:
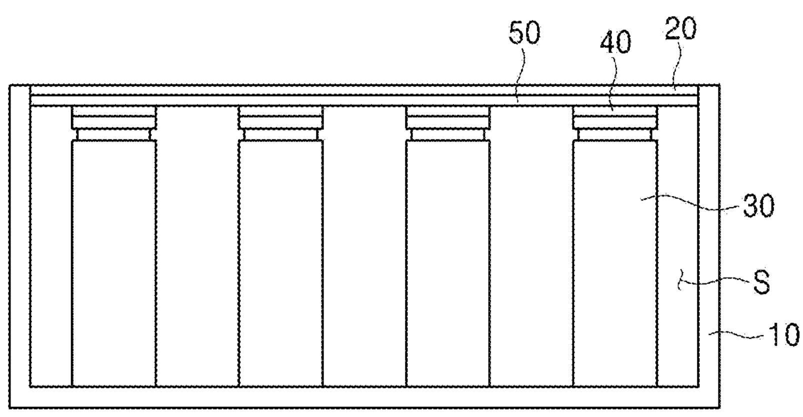
FIG. 2 is a cross-sectional view illustrating the battery pack in accordance with an exemplary embodiment.

FIG. 1 is an exploded view illustrating a battery pack in accordance with an exemplary embodiment. FIG. 2 is a cross-sectional view illustrating the battery pack in accordance with an exemplary embodiment.

Figure 3:
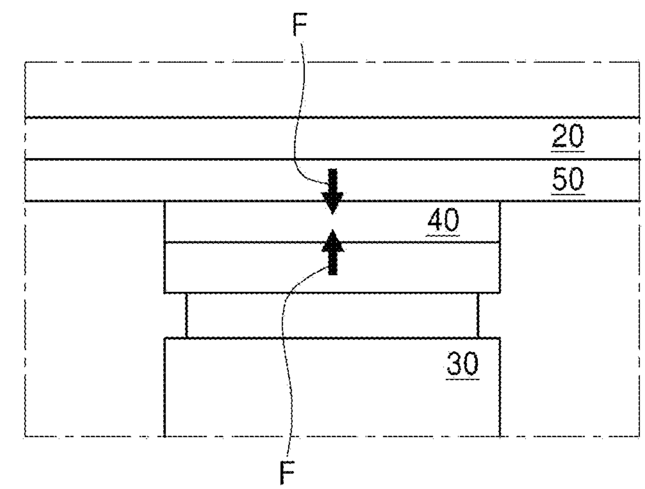
FIG. 3 is a schematic view illustrating a state of fixing a battery cell in the battery pack in accordance with an exemplary embodiment.

FIG. 3 is a schematic view illustrating a state of fixing a battery cell in the battery pack in accordance with an exemplary embodiment. FIG. 3 is a partially enlarged view illustrating a structure of electrically connecting the battery cell in the battery pack in accordance with an exemplary embodiment.

The battery pack in accordance with an exemplary embodiment includes a battery pack housing 10 and 20, a plurality of battery cells 30 disposed in the battery pack housing 10 and 20, and a fixing unit 40 and 50 disposed in the battery pack housing 10 and 20 to fix a position of the plurality of battery cells 30 by using a magnetic force.

Also, the battery pack in accordance with an exemplary embodiment may further include a bus bar assembly 60 and 61 disposed in the battery pack housing 10 and 20 to electrically connect the plurality of battery cells 30.

1.1. Battery Pack Housing 10 and 20

The battery pack housing 10 and 20 may include a battery pack housing lower case 10 and a battery pack housing upper cover 20.

The battery pack housing lower case 10 may include a bottom plate having a predetermined area and a sidewall plate extending by a predetermined height upward from an edge of the bottom plate. Here, the battery pack housing lower case 10 may have a rectangular container having an opened upper portion. Alternatively, the battery pack housing lower case 10 may have various shapes.

The battery pack housing upper cover 20 may be a plate having a predetermined area. The battery pack housing upper cover 20 may be fitted and coupled to the upper opening of the battery pack housing lower case 10. Alternatively, the battery pack housing upper cover 20 may have various coupling structures. Here, the battery pack housing upper cover 20 may have a rectangular plate shape. Alternatively, the battery pack housing upper cover 20 may have various shapes.

An inner space in which the plurality of battery cells 30 are accommodated may be defined between the battery pack housing lower case 10 and the battery pack housing upper cover 20.

1.2. The Plurality of Battery Cells 30

For example, the plurality of battery cells 30 may be a plurality of cylindrical can-type secondary batteries. The plurality of battery cells 30 may be accommodated in the inner space of the battery pack housing 10 and 20. Each of the plurality of battery cells 30 may include a positive electrode terminal at an upper portion thereof and a negative electrode terminal at a lower portion thereof.

For example, each of the plurality of battery cells 30 may include a cylindrical battery can having an opened upper portion, a jelly-roll type electrode assembly, an upper cap mounted to the upper opening of the battery can, and a positive electrode terminal supported by the upper cap and connected with the electrode assembly. Here, the negative electrode terminal may form a bottom surface of the battery can.

The upper cap may include a magnetic body. For example, the upper cap may be magnetized by a magnet, and attached and coupled to the magnet by a magnetic force. The upper cap may be made of various materials such as steel, aluminum, and stainless steel.

An empty space S may exist between the plurality of battery cells 30. Here, a plurality of first members 40 respectively contacting the plurality of battery cells 30 may be sufficiently spaced apart from each other by the empty space S. Also, at least one of a spacer (not shown) and a filling material (not shown) may be disposed between the plurality of battery cells 30.

1.3. Fixing Unit 40 and 50

The fixing unit 40 and 50 may include: a plurality of first members 40 each having a size corresponding to a size of a top surface of each of the plurality of battery cells 30 and attached and coupled to the top surface of the battery cell 30 by a magnetic force; and a plurality of second members 50 each having a size corresponding to a size of a bottom surface of the battery pack housing upper cover and attached and coupled to the plurality of first members 40 by a magnetic force That is, the fixing unit 40 and 50 may be disposed on the plurality of battery cells 30 and coupled with the plurality of battery cells 30 by a magnetic force. Thus, the plurality of battery cells 30 may be easily and quickly attached to and detached from the fixing unit 40 and 50. Also, the plurality of battery cells 30 may be firmly restrained to the fixing unit 40 and 50.

Here, the above-described corresponding size represents that the first member 40 has a size not greater than an area of the top surface or bottom surface of the battery cell.

Also, the above-described corresponding size represents that the first member 40 has a size that does not invade an area of the neighbored battery cell although the size of the first member 40 is greater than the area of the top surface or bottom surface of the battery cell 30.

Also, the fixing unit 40 and 50 may be electrically insulated from each of the battery pack housing 10 and 20 and the plurality of battery cells 30.

1.4. First Member 40

The first member 40 may have, e.g., a circular plate shape. Alternatively, the first member 40 may have various shapes. The first member 40 may have a size less than the area of the top surface of the battery cell 30 or equal to the area of the top surface of the battery cell 30 within a predetermined range. Here, the predetermined range may be a systematic error range.

Alternatively, the first member 40 may have a size greater by a predetermined difference than the area of the top surface of the battery cell 30 within a range in which the first member 40 contacts the battery cell 30 with a sufficient area and does not invade the area of the neighbored battery cell. Thus, the first members 40 neighbored with each other may not contact each other.

The first member 40 may be a magnet. More specifically, the first member 40 may be a permanent magnet. The first member 40 may have a magnetic force having a predetermined magnitude capable of strongly attaching the battery cell 30.

The number of the first members 40 may be equal to that of the battery cells 30. The first members 40 may be attached and coupled to the battery cells 30 in a one-to-one correspondence manner. Here, a bottom surface of the first member 40 may be attached and coupled to the top surface of the battery cell 30 by a magnetic force. That is, an attractive force F may be formed between the bottom surface of the first member 40 and the top surface of the battery cell 30.

1.5. Second Member 50

The second member 50 may be a predetermined plate. The second member 50 may have a shape corresponding to that of the battery pack housing upper cover 20. Also, the second member 50 may have a size corresponding to that of the bottom surface of the battery pack housing upper cover 20. More specifically, the second member 50 may have the same shape as the battery pack housing upper cover 20 and have the same size as the bottom surface of the battery pack housing upper cover 20. Thus, the second member 50 may have an edge contacting and supported by inner side surfaces of the battery pack housing lower case 10 in the battery pack housing 10 and 20. Thus, the second member 50 may not move in a horizontal direction in the battery pack housing 10 and 20.

The second member 50 may have a top surface contacting the bottom surface of the battery pack housing upper cover 20 and a bottom surface attached and coupled to a top surface of the first member 40. Thus, the second member 50 may not move in a vertical direction in the battery pack housing 10 and 20. Accordingly, the first member 40 may not move in the horizontal direction and the vertical direction in the battery pack housing 10 and 20, and the plurality of battery cells 30 may be firmly fixed in the battery pack housing 10 and 20.

The second member 50 may be a magnet or a magnetic body. When the second member 50 is a magnet, the first member 40 and the second member 50 may have polarities so that the attractive force F is applied between the top surface of the first member 40 and a bottom surface of the second member 50. Specifically, different polarities may be formed on surfaces facing each other of the second member 50 and the first member 40.

For example, when the bottom surface of the second member 50 is an N pole, the top surface of the first member 40 may be an S pole. Here, the top surface of the second member 50 may be the S pole, and the bottom surface of the first member 40 may be the N pole.

Also, when the bottom surface of the second member 50 is the S pole, the top surface of the first member 40 may be the N pole. Here, the top surface of the second member 50 may be the N pole, and the bottom surface of the first member may be the S pole.

When the second member 50 is a magnetic body, the second member 50 may be made of a predetermined material magnetized by a magnet, and attached and coupled to a magnet by a magnetic force. The second member 50 may be made of various materials such as steel, aluminum, and stainless steel.

1.6. Bus Bar Assembly 60 and 61

The bus bar assembly 60 and 61 may be formed at an opposite side of the plurality of battery cells 30 based on the second member 50, arranged to pass through a hole defined in the first member 40 and a hole defined in the second member 50, and contact and be connected to a positive electrode terminal of each of the plurality of battery cells.

The bus bar assembly 60 and 61 may include a base busbar 60 extending with a predetermined pattern and disposed between the battery pack housing upper cover 20 and the second member 50 and an electrode contact terminal 61 extending downward from the base busbar 60 and elastically contacting and electrically connected to the positive electrode terminal of each of the plurality of battery cells 40.

The base busbar 60 may have a predetermined pattern shape and be made of a plate-shaped metal material. Also, an insulation layer (not shown) may be disposed between the base busbar 60 and each of the battery pack housing upper cover 20 and the second member 50. The base busbar 60 may be connected with an external input and output terminal (not shown) of the battery pack.

Each of a plurality of electrode contact terminals 61 may be made of a metal material having electrical conductivity and elasticity. The plurality of electrode contact terminals 61 may respectively contact and be electrically connected to the positive electrode terminals of the plurality of battery cells 30. That is, each of the plurality of electrode contact terminals 61 may act like a leaf spring and stably elastically contact each of the positive electrode terminals.

Here, a first hole H1 may pass through the first member 40 so that the busbar contacts the terminal of the battery cell 30 therethrough. The first hole H1 may be formed in an area corresponding to the positive electrode of the battery cell 30. The positive electrode of the battery cell 30 may be exposed upward through the first hole H1.

Here, a plurality of second holes H2 may pass through the second member 50 so that the busbar contacts the terminal of the battery cell 30 therethrough. The plurality of second holes H2 may be formed in an area corresponding to the positive electrode of the battery cell 30. The positive electrodes of the plurality of battery cells 30 may be exposed upward through the plurality of second holes H2.

The electrode contact terminal 61 may contact and be electrically connected to the positive electrode terminal through the first hole H1 and the second hole H2. Here, the base busbar 60 connected with the electrode contact terminal 61 may extend to an area of different battery cells, i.e., neighbored battery cells, and connect the electrode contact terminals 61 of the area of the neighbored battery cells. The above-described busbar assembly 60 and 61 may be referred to as a busbar or a positive electrode busbar.

The battery pack in accordance with an exemplary embodiment may include a negative electrode busbar (not shown). The negative electrode busbar may be disposed below the plurality of battery cells 30 and connected to a negative electrode terminal of each of the plurality of battery cells 30. The negative electrode busbar may have various structures.

1.7. Bus Bar Assembly 60 and 61 in Accordance with a Modified Example

The busbar assembly in accordance with a modified example may have a structure different from that of the above-described busbar assembly 60 and 61 in accordance with an exemplary embodiment.

Figure 5:
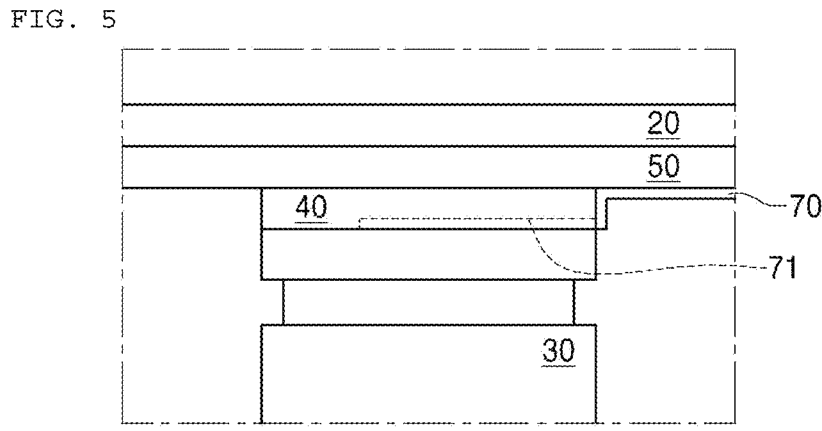
FIG. 5 is a partially enlarged view illustrating a structure of electrically connecting the battery cells in the battery pack in accordance with a modified example.

FIG. 5 is a partially enlarged view illustrating a structure of electrically connecting the battery cells in the battery pack in accordance with a modified example.

The busbar assembly in accordance with a modified example may include a base busbar 70 patterned with a predetermined shape on a surface of the first member 40 and a surface of the second member 50 and a plurality of electrode contact terminals 71 patterned on the bottom surface of each of the plurality of first members 40, contact and be connected to the positive electrode terminal of each of the plurality of battery cells 30, and connected with the base busbar 70. Thus, the busbar assembly in accordance with a modified example may be further stably connected to the positive electrode terminal of each of the plurality of battery cells 30 than the busbar assembly 60 and 61 in accordance with an exemplary embodiment.

1.8. Busbar Assembly in Accordance with Another Modified Example

In accordance with another modified example, only the second member 50 may be electrically insulated while the first member 40 is not electrically insulated.

In this case, the first member 40 may have both magnetism and electrical conductivity, each of which has a magnitude corresponding to the electrode of each of the battery cells, and contact the electrode of each of the battery cells.

Figure 4:
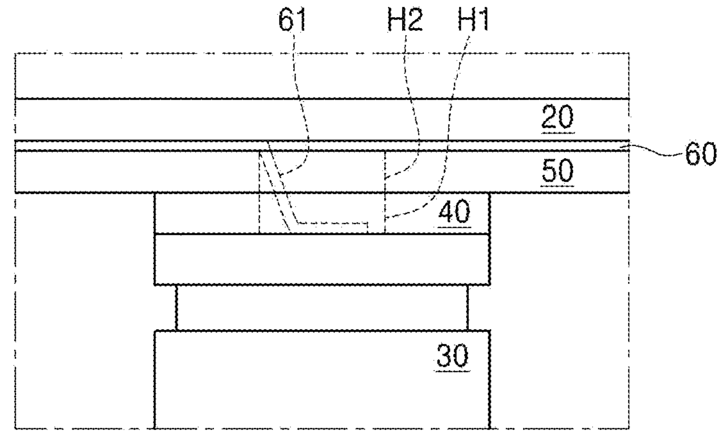
FIG. 4 is a partially enlarged view illustrating a structure of electrically connecting the battery cells in the battery pack in accordance with an exemplary embodiment.

Thus, the busbar assembly may include only the base busbar 60 without the separate electrode contact terminal 61 from the busbar assembly of FIG. 4 and be disposed between the first member 40 and the second member 50 to electrically connect the first members 40 respectively connected to the electrodes of the battery cells.

As described above, in accordance with another modified example, as only the second member 50 is electrically insulated while the first member 40 is not electrically insulated, the busbar assembly may have a simplified structure.

2. Battery Pack Including Fixing Unit Using Magnetic Force in Accordance with Another Exemplary Embodiment (Second Embodiment)

Figure 6:
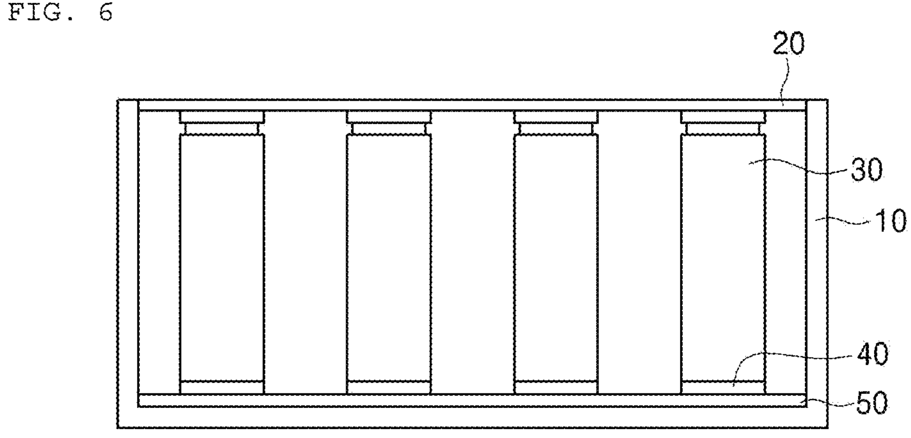
FIG. 6 is a cross-sectional view illustrating a battery pack in accordance with another exemplary embodiment (second embodiment).

FIG. 6 is a cross-sectional view illustrating a battery pack in accordance with another exemplary embodiment.

The battery pack in accordance with another exemplary embodiment may be different in structure of a fixing unit from the battery pack in accordance with an exemplary embodiment.

A fixing unit 40 and 50 of the battery pack in accordance with another exemplary embodiment may include: a plurality of first members 40 each having a size corresponding to a size of a bottom surface of each of a plurality of battery cells and attached and coupled to the bottom surface of each of the plurality of battery cells by a magnetic force; and a second member 50 having a size corresponding to a size of a bottom surface of a battery pack housing lower case 10 and attached and coupled to the plurality of first members 40 by a magnetic force.

That is, the fixing unit 40 and 50 of the battery pack in accordance with another exemplary embodiment may be coupled with a lower portion of the battery cell by a magnetic force to fix the battery cell.

Since a weight is biased to a lower portion of the battery pack in this structure, the battery pack may have a further stable structure. Also, the battery pack may further smoothly dissipate heat to an upper portion of the battery pack.

3. Battery Pack Including Fixing Unit Using Magnetic Force in Accordance with Yet Another Exemplary Embodiment (Third Embodiment)

Figure 7:
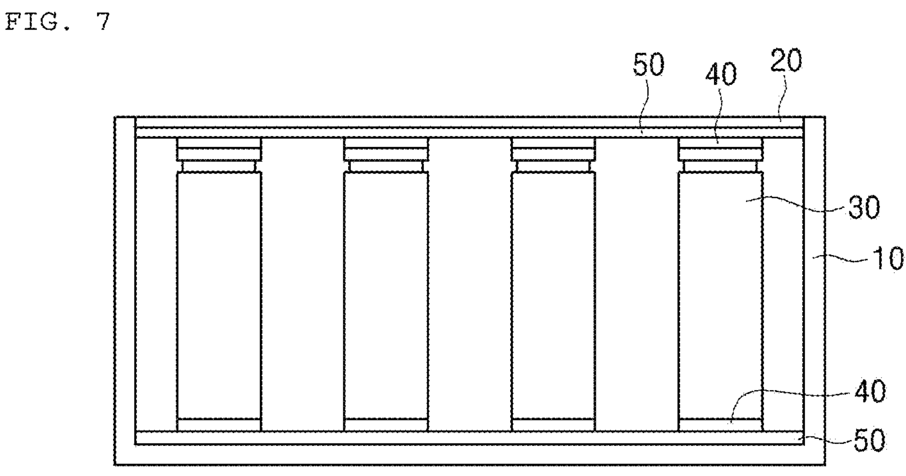
FIG. 7 is a cross-sectional view illustrating a battery pack in accordance with yet another exemplary embodiment (third embodiment).

FIG. 7 is a cross-sectional view illustrating a battery pack in accordance with yet another exemplary embodiment.

The battery pack in accordance with yet another exemplary embodiment may be different in structure of a fixing unit from the battery pack in accordance with an exemplary embodiment and the battery pack in accordance with another exemplary embodiment.

A fixing unit 40 and 50 of the battery pack in accordance with yet another exemplary embodiment may include: a plurality of first members 40 each having a size corresponding to a size of each of a top surface and a bottom surface of each of a plurality of battery cells and attached and coupled to the top surface and the bottom surface of each of the plurality of battery cells by a magnetic force; and a plurality of second members 50 respectively disposed above and below the plurality of battery cells and attached and coupled to the plurality of first members 40 by a magnetic force.

That is, the fixing unit 40 and 50 of the battery pack in accordance with yet another exemplary embodiment may be coupled with all of an upper portion and a lower portion of the battery cell by a magnetic force to fix the battery cell. Thus, the plurality of battery cells 30 may be further stably fixed.

4. Battery Pack Including Fixing Unit Using Magnetic Force in Accordance with Still Another Exemplary Embodiment (Fourth Embodiment)

Figure 8:
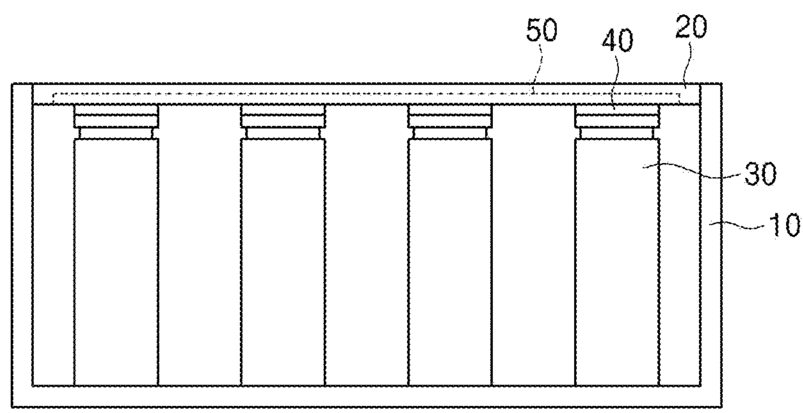
FIG. 8 is a cross-sectional view illustrating a battery pack in accordance with still another exemplary embodiment (fourth embodiment).

FIG. 8 is a cross-sectional view illustrating a battery pack in accordance with still another exemplary embodiment.

The battery pack in accordance with still another exemplary embodiment may be different in position of a second member from the battery pack in accordance with an exemplary embodiment.

That is, in accordance with still another exemplary embodiment, at least a portion of a second member 50 may be embedded in a bottom surface side of a battery pack housing upper cover 20. Thus, the second member 50 may be coupled with a first member 40 by a magnetic force while the battery pack housing upper cover 20 is coupled to a battery pack housing lower case 10 when the battery pack is manufactured. Thus, processes for manufacturing the battery pack may be reduced.

5. Battery Pack Including Fixing Unit Using Magnetic Force in Accordance with Further Another Exemplary Embodiment (Fifth Embodiment)

Figure 9:
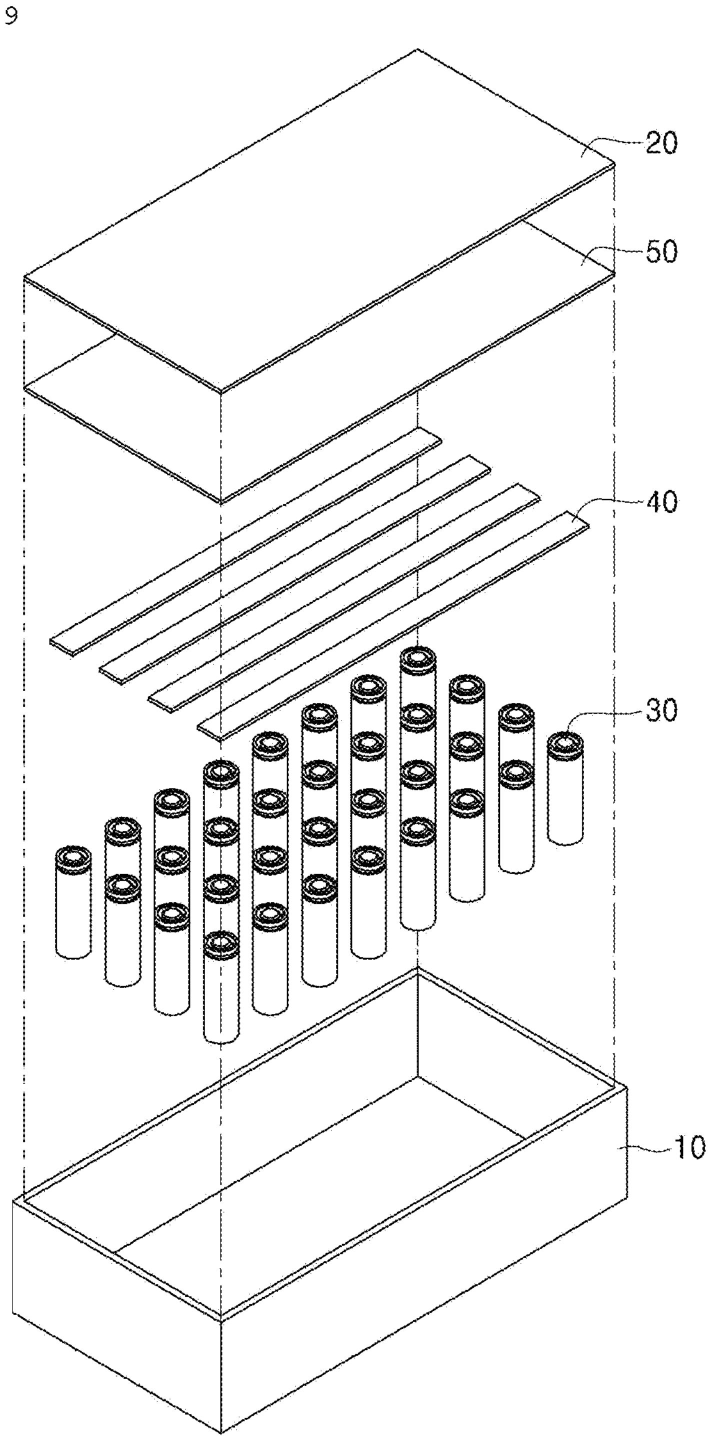
FIG. 9 is a cross-sectional view illustrating a battery pack in accordance with further another exemplary embodiment (fifth embodiment).

FIG. 9 is a cross-sectional view illustrating a battery pack in accordance with further another exemplary embodiment.

The battery pack in accordance with further another exemplary embodiment may be different in position of a second member from the battery pack in accordance with an exemplary embodiment.

In accordance with further another exemplary embodiment, a first member 40 may have a width corresponding to a size of a top surface of a battery cell and a length greater than the width. In this structure, one first member 40 may be coupled with a plurality of battery cells. Thus, a time required for coupling a plurality of first members 40 and a plurality of battery cells 30 may be reduced.

6. Battery Pack Including Fixing Unit Using Magnetic Force in Accordance with Yet Still Another Exemplary Embodiment (Sixth Embodiment)

A battery pack in accordance with yet still another exemplary embodiment may be different in position of a second member from the battery pack in accordance with another exemplary embodiment.

That is, in accordance with yet still another exemplary embodiment, at least a portion of a second member 50 may be embedded in a bottom surface side of a battery pack housing lower case 10. Thus, the second member 50 may be quickly coupled with a first member 40 while a plurality of battery cells 30 to which the first member 40 is attached are arranged on a bottom surface of the battery pack housing lower case 10 when the battery pack is manufactured.

7. Battery Pack Including Fixing Unit Using Magnetic Force in Accordance with Further Still Another Exemplary Embodiment (Seventh Embodiment)

A battery pack in accordance with further still another exemplary embodiment may further include an anti-slippery film.

The anti-slippery film (not shown) may be applied to at least a portion of a surface of a first member 40. Also, the anti-slippery film may have a predetermined thickness allowing a magnetic force to be transmitted therethrough. The anti-slippery film may increase a friction force between the first member 40 and a battery cell 30. The anti-slippery film may be made of a predetermined resin material. Alternatively, the anti-slippery film may be made of various materials.

8. Method for Manufacturing Battery Pack Including Fixing Unit Using Magnetic Force in Accordance with an Exemplary Embodiment A method for manufacturing a battery pack including fixing unit using magnetic force in accordance with an exemplary embodiment includes: a process of arranging a plurality of battery cells 30 in a battery pack housing lower case 10; a process of allowing the plurality of battery cells 30 and a fixing unit 40 and 50 to contact each other and attaching and coupling the plurality of battery cells 30 and the fixing unit 40 and 50 by using a magnetic force; and a process of sealing the battery pack housing lower case 10 by a battery pack housing upper cover 20.

8.1. Process of Arranging the Plurality of Battery Cells in Battery Pack Housing Lower Case The process of arranging the plurality of battery cells 30 in the battery pack housing lower case 10 allows the plurality of battery cells 30 to descend into the battery pack housing lower case 10 through an upper opening of the battery pack housing lower case 10 and allows the plurality of battery cells 30 to be seated on a bottom surface of the battery pack housing lower case 10.

Here, the fixing unit 40 and 50 may be arranged on the bottom surface of the battery pack housing lower case 10, and then the plurality of battery cells 30 may be arranged thereon.

8.2. Process of Attaching and Coupling the Plurality of Battery Cells and Fixing Unit The process of attaching and coupling the plurality of battery cells and the fixing unit allows a first member 40 to contact an upper portion of each of the plurality of battery cells 30 and allows the first member 40 to contact a second member 50. In this process, the plurality of battery cells 30 and the first member 40 are coupled, and the first member 40 and the second member 50 are coupled by using a magnetic force of the first member 40 and a magnetic force of the first member 40 and the second member 50.

Alternatively, a lower portion of each of the plurality of battery cells 30 may contact the first member 40 in contact with the second member 50.

Also, the lower portion of each of the plurality of battery cells 30 may contact the first member 40 in contact with the second member 50, and then the first member 40 may contact the upper portion of each of the plurality of battery cells 30, and the first member 40 may contact the second member 50.

Through the above-described processes, the plurality of battery cells 30 may be stably fixed in the battery pack housing lower case 10.

In this process, a busbar assembly 60 and 61 in which each of the first member 40 and the second member 50 are assembled at a predetermined position and the plurality of battery cells 30 may be electrically connected to each other. Alternatively, a busbar assembly 70 and 71 in which each of the first member 40 and the second member 50 are patterned at a predetermined position and the plurality of battery cells 30 may be electrically connected to each other.

Also, a negative electrode busbar (not shown) may be connected with a negative electrode terminal of each of the plurality of battery cells 30 while performing the process of arranging the plurality of battery cells 30 in the battery pack housing lower case 10 or the process of allowing the plurality of battery cells 30 and the fixing unit 40 and 50 to contact each other and attaching and coupling the plurality of battery cells 30 and the fixing unit 40 and 50 by using the magnetic force.

8.3. Process of Sealing Battery Pack Housing Lower Case by Battery Pack Housing Upper Cover The process of sealing the battery pack housing lower case by the battery pack housing upper cover fits and couples the battery pack housing upper cover 20 to an upper opening of the battery pack housing lower case 10. Here, a bottom surface of the battery pack housing upper cover 20 may press the second member 50 and the plurality of battery cells 30 with a predetermined pressure in a downward direction.

9. Method for Replacing Battery Cell of Battery Pack Including Fixing Unit Using Magnetic Force in Accordance with an Exemplary Embodiment A method for replacing a battery cell of a battery pack in accordance with an exemplary embodiment, which is a method for replacing the battery cell of the battery pack including a plurality of battery cells 30, includes: a process of separating a battery pack housing lower case 10 from an upper cover 20; a process of a fixing unit 40 and 50 attached and coupled to the plurality of battery cells 30 by a magnetic force from the plurality of battery cells 30 in the battery pack housing lower case 10; a process of replacing battery cells to be replaced among the plurality of battery cells 30 with new battery cells; a process of attaching and coupling the fixing device 40 and 50 to a plurality of battery cell that are new battery cells with which the battery cells to be replaced are replaced by using the magnetic force of the fixing unit 40 and 50; and a process of coupling the battery pack housing lower caser 10 with the upper cover 20 to complete maintenance of the battery pack.

That is, when a portion of the battery cells are damaged while the battery pack is used, the damaged battery cells may be replaced with new battery cells by performing the above-described processes.

Specifically, when damage of the battery cells is detected, the battery pack housing lower caser 10 is separated from the upper cover 20, and a second member 50 and a first member 40 are separated from the plurality of battery cells 30.

Alternatively, a coupled body in which the plurality of battery cells 30 are coupled with the second member 50 and the first member 40 is withdrawn from the battery pack housing lower caser 10.

Thereafter, as contact between the problematic battery cell and each of the second member 50 and the first member 40 is released to break a magnetic force coupling therebetween. Through the above-described method, the fixing unit 40 and 50 attached and coupled to the plurality of battery cells by the magnetic force is separated from the plurality of battery cells 30. Thereafter, the battery cells to be replaced among the plurality of battery cells 30 are replaced with the new battery cells, and the plurality of battery cells that are the new battery cells with which the battery cells to be replaced are replaced are attached and coupled to the fixing unit 40 and 50 by using the magnetic force of the fixing unit 40 and 50. Thereafter, the battery pack housing lower case 10 and the upper cover 20 may be coupled to complete the maintenance of the battery pack.

In accordance with the exemplary embodiment, the plurality of battery cells may be easily fixed in the battery pack housing by using the magnetic force. Thus, the internal structure of the battery pack may be simplified while securing the performance and safety of the battery pack.

Also, all sorts of welding works such as wire bonding, resistance welding, and laser welding may be omitted when the battery pack is manufactured. Thus, the time required for manufacturing the battery pack may be reduced, and the manufacturing costs may be reduced.

Also, since only the battery cells damaged while the battery pack is used are easily replaced, the battery pack may be semi-permanently used.

Although the embodiments of the present invention have been described, it is understood that the present invention should not be limited to these embodiments but various changes and modifications can be made by one ordinary skilled in the art within the spirit and scope of the present invention as hereinafter claimed. That is, it will be readily understood by those skilled in the art that various modifications and changes can be made thereto without departing from the spirit and scope of the present invention defined by the appended claims.

DESCRIPTION OF THE REFERENCE SIGNS

10: Battery pack housing lower case, 20: Battery pack housing upper case, 30: Battery cell, 40: First member, 50: Second member, 60, 70: Base busbar, 61, 71: Electrode contact terminal

What is claimed is:

1. A battery pack comprising:

a battery pack housing;

a plurality of battery cells in the battery pack housing;

a fixing unit in the battery pack housing and configured to fix a position of the plurality of battery cells by a magnetic force; and a busbar assembly on the fixing unit, wherein a hole is defined in the fixing unit so that the busbar assembly passes through the fixing unit to contact a respective electrode of each of the plurality of battery cells.

2. The battery pack of claim 1, wherein the fixing unit comprises:

a plurality of first members respectively attached and coupled to top surfaces of the plurality of battery cells by the magnetic force; and a second member having a size corresponding to that of a bottom surface of a battery pack housing upper cover and attached and coupled to the plurality of first members by the magnetic force.

3. The battery pack of claim 1, wherein the fixing unit comprises:

a plurality of first members respectively attached and coupled to bottom surfaces of the plurality of battery cells by the magnetic force; and a second member having a size corresponding to that of a bottom surface of a battery pack housing lower case and attached and coupled to the plurality of first members by the magnetic force.

4. The battery pack of claim 1, wherein the fixing unit comprises:

a plurality of first members attached and coupled to a top surface and a bottom surface of each of the plurality of battery cells by the magnetic force; and a plurality of second members respectively above and below the plurality of battery cells and attached and coupled to the plurality of first members by the magnetic force, wherein the plurality of second members comprises the second member above the plurality of battery cells, which has a size corresponding to that of a bottom surface of a battery pack housing upper cover, and the second member below the plurality of battery cells, which has a size corresponding to that of a bottom surface of a battery pack housing lower case.

5. The battery pack of claim 2, wherein the first member has a size corresponding to a top surface or a bottom surface of the battery cell and is coupled with the battery cell in a one-to-one correspondence manner, or the first member has a size greater than that of the top surface or the bottom surface of the battery cell and is coupled with the plurality of battery cells.

6. The battery pack of claim 2, wherein the first member is a magnet, and the second member is a magnetic body.

7. The battery pack of claim 2, wherein each of the first member and the second member is a magnet, and wherein the first member and the second member have polarities so that an attractive force is applied between a top surface of the first member and a bottom surface of the second member.

8. The battery pack of claim 2, wherein at least a portion of the second member is embedded and coupled to a bottom surface side of the battery pack housing upper cover.

9. The battery pack of claim 3, wherein at least a portion of the second member is embedded and coupled to a bottom surface side of the battery pack housing lower case.

10. The battery pack of claim 1, wherein an empty space exists or at least one of a spacer and a filling material is between the plurality of battery cells.

11. The battery pack of claim 2, wherein the hole is defined in each of the first member and the second member so that the busbar assembly passes therethrough to contact the respective electrode of each of the plurality of battery cells.

12. The battery pack of claim 11, wherein the busbar assembly is at an opposite side of the plurality of battery cells based on the second member, passes through the hole defined in the first member and the hole defined in the second member, and is connected to the respective electrode of each of the plurality of battery cells.

13. The battery pack of claim 2, wherein the busbar assembly is provided on a surface of the first member and a surface of the second member, wherein the busbar assembly contacts and is connected to the respective electrode of each of the plurality of battery cells.

14. The battery pack of claim 3, wherein the hole is defined in each of the first member and the second member so that the busbar assembly passes therethrough to contact the respective electrode of each of the plurality of battery cells.

15. The battery pack of claim 3, wherein the busbar assembly is provided on a surface of the first member and a surface of the second member, wherein the busbar assembly contacts and is connected to the respective electrode of each of the plurality of battery cells.

16. The battery pack of claim 1, wherein the fixing unit comprises:

a plurality of first members respectively attached and magnetically coupled to respective ends of the plurality of battery cells; and a second member having a size corresponding to that of a bottom surface of a battery pack housing upper cover, the second member being attached and magnetically coupled to the plurality of first members.

17. The battery pack of claim 16, wherein the hole is defined in each of the first member and the second member so that the busbar assembly passes therethrough to contact the respective electrode of each of the plurality of battery cells.

18. The battery pack of claim 16, wherein the busbar assembly is provided on a surface of the first member and a surface of the second member, wherein the busbar assembly contacts and is connected to the respective electrode of each of the plurality of battery cells.

19. The battery pack of claim 1, wherein the fixing unit comprises a magnet, and wherein the fixing unit is attached to and coupled to the plurality of battery cells by the magnetic force.

* * * * *